Jan. 26, 1971 C. A. ROPP, JR 3,558,358
NICKEL-ZINC SECONDARY BATTERY
Filed March 10, 1969

INVENTOR.
Chester A. Ropp, Jr.
BY
Wood, Herron & Evans
ATTORNEYS

United States Patent Office 3,558,358
Patented Jan. 26, 1971

3,558,358
NICKEL-ZINC SECONDARY BATTERY
Chester A. Ropp, Jr., Carterville, Mo., assignor to Eagle-Picher Industries, Inc., Cincinnati, Ohio, a corporation of Ohio
Filed Mar. 10, 1969, Ser. No. 805,461
Int. Cl. H01m 35/00, 3/00
U.S. Cl. 136—6                                                   5 Claims

ABSTRACT OF THE DISCLOSURE

A secondary battery including positive electrodes comprising nickel and negative electrodes comprising zinc immersed in a caustic electrolyte, the negative zinc electrode being enclosed in an electrode wrapper fabricated of polyvinyl alcohol which is impermeable to zincate ions while being permeable to hydroxyl ions as is necessary to sustain ionic conduction involved in electro-chemical battery action.

---

This invention relates to secondary batteries and more particularly to alkaline batteries employing positive electrodes fabricated of a composition including nickel, and negative electrodes fabricated of a composition including zinc.

Batteries are of two principal types, namely, primary batteries and secondary batteries. Primary batteries are characterized by irreversible chemical activity during the discharging thereof and consequently cannot be subsequently recharged by applying a reverse electrical potential to the battery electrodes. Accordingly, primary batteries can be used only once. Secondary batteries are characterized by reversible chemical action during the discharge thereof enabling them to be recharged and used many times. Of the available secondary batteries, one class includes those secondary batteries using nickel, zinc, silver, and cadmium in various combinations as the electrode couple. To date, only three of the four possible two-element combinations of nickel, zinc, cadmium and silver have been practical, namely, silver-zinc, nickel-cadmium, and silver-cadmium. Batteries utilizing the nickel-zinc couple have not heretofore proven feasible.

The production of a practical nickel-zinc battery has been prevented by two specific difficulties, namely, zinc poisoning of the nickel electrode and dendritic growth forming at the negative zinc electrode. The zinc poisoning of the positive nickel electrode produces a condition wherein the battery, after only a few cycles of operation, stops working as a battery, acquiring the charge characteristics of a variable resistor and causing charge currents to develop. While charging currents develop what appears to be a charge response, little energy is stored in the battery cells. Dendritic growth at the negative zinc electrode produces a condition wherein continued growth of dendrites eventually physically bridges the gap between the negative zinc electrode and the adjacent positive electrode, short-circuiting the opposite polarity electrodes.

It has been an objective of this invention to provide a secondary battery of the type employing nickel positive and zinc negative plates which overcomes the zinc poisoning and dendritic growth short-circuiting problem, thereby enabling a battery to be produced which is susceptive of substantial recycling without failure. This objective has been overcome in accordance with the principles of this invention by utilizing an utterly unobvious approach involving the provision of a wrapper for the negative zinc electrode fabricated of a critical material, specifically, polyvinyl alcohol film having a mole weight in the approximate range of 120,000–170,000. With nickel-zinc batteries having their negative zinc plate enclosed in the critical wrapper material of this invention, a practical nickel-zinc battery has been produced which reduces zinc poisoning of the positive nickel electrode and short-circuiting due to dendritic growth so substantially that the recycling capability has increased from five or six cycles for batteries not employing the critical zinc electrode wrapper of this invention to one hundred or more cycles for batteries constructed in accordance with this invention.

While the exact reason for the success of nickel-zinc batteries employing the critical mole weight polyvinyl alcohol zinc electrode wrapper of this invention is not clearly understood, it has been hypothesized that the polyvinyl alcohol wrapper contains, to a region within the wrapper, zincate ions which form at the negative zinc plate during discharge of the battery while simultaneously permitting hydroxyl ions necessary to sustain the ionic current required for battery action to permeate the wrapper. This containment of zincate ions during discharge prevents these ions from entering the electrolytic solution where they can become adsorbed at the surface of the positive nickel electrode to produce the undesirable condition of zinc poisoning, as well as plate onto either or both of the electrode wrappers during recharging thereby short-circuiting the electrodes. Thus, the critical mole weight polyvinyl alcohol zinc electrode wrapper of this invention restricts the movement of zincate ions, preventing dendritic growth and zinc poisoning, without inhibiting the flow of hydroxyl ions and thereby deleteriously affecting the ionic conduction essential to electro-chemical battery action.

Other objectives and advantages of this invention will be more readily apparent from a detailed description of the invention taken in conjunction with the accompanying drawings in which.

Figure 1:
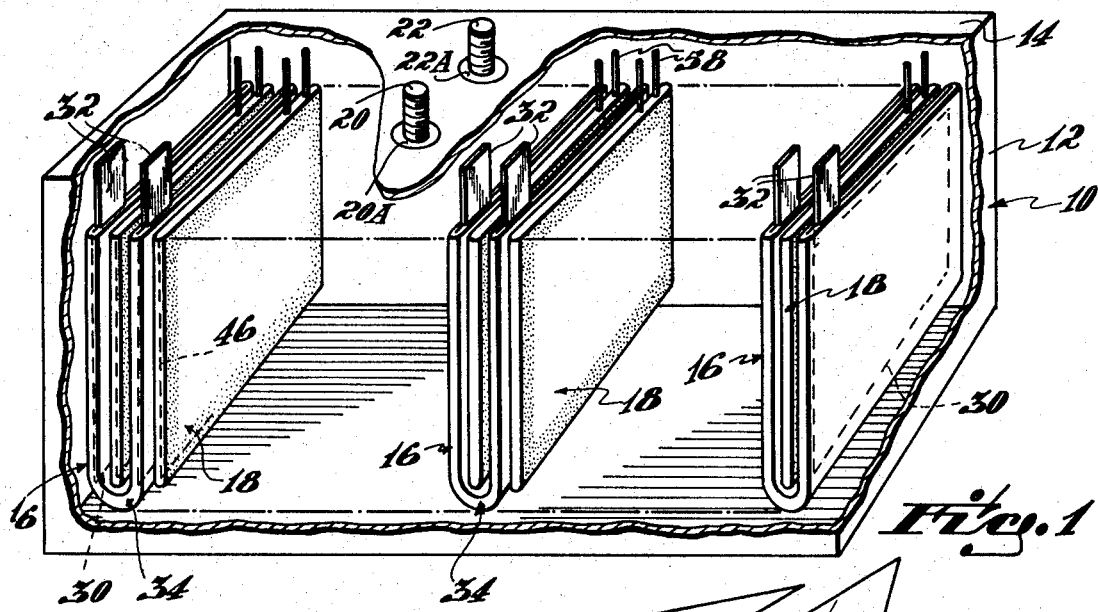
FIG. 1 is a schematic perspective view of a multi-electrode secondary battery cell utilizing a nickel-zinc couple.

Depicted in FIG. 1 is a battery cell 10 constructed in accordance with the principles of this invention. The battery cell 10 includes a cell casing 12 and cell cover 14 suitably configured and dimensioned to completely encase a plurality of alternately spaced positive plates or electrodes 16 and negative plates or electrodes 18 to be described in more detail later. The cell casing 12 and cell cover 14 may be fabricated of any suitable material having the proper physical and chemical properties which constitute a good cell case, such as molded polystyrene or other equivalent plastic material. The cell cover 14 is provided with a positive terminal 20 and a negative terminal 22 having lower portions 20A and 22A projecting into the interior of the cell to facilitate electrical interconnections between the positive plate 16 and the positive terminal 20 and the negative plate 18 and the negative terminal 22. In one preferred cell construction characterized as a five ampere-hour battery and having twelve positive plates interleaved with eleven negative plates 18 each measuring 4.9 centimeters wide by 5.9 centimeters high by .071 centimeter thick, a cell casing 12 having a width of 5.5 centimeters, a height of 10 centimeters and a thickness of 2.4 centimeters was found satisfactory. The cell casing having these dimensions has a volume of approximately 130 cubic centimeters and represents a total weight including the plates 16 and 18 of approximately 245 grams.

Figure 2:
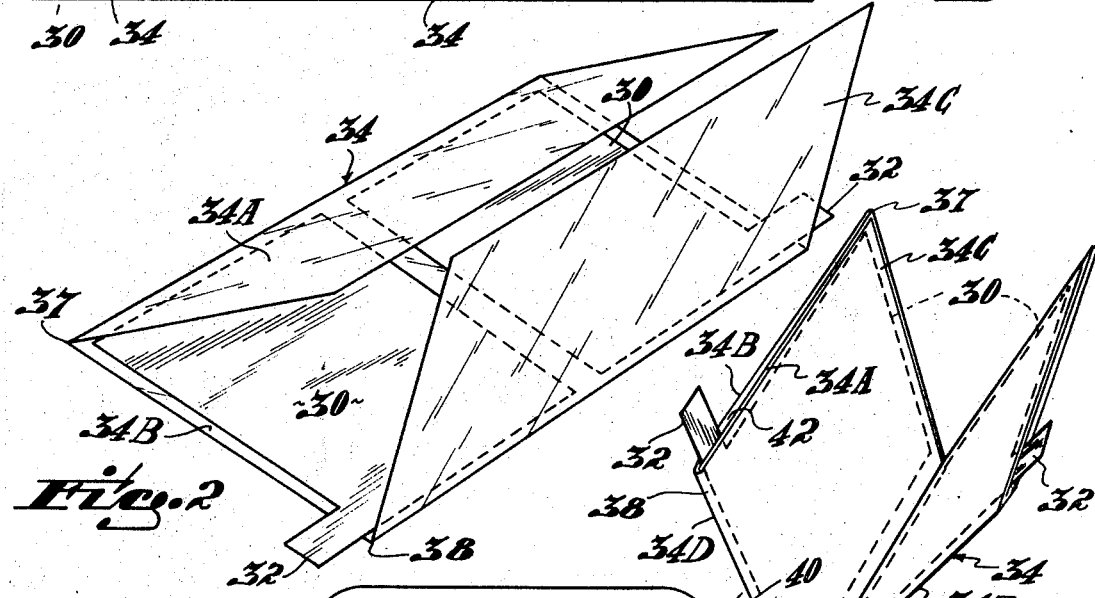
FIGS. 2 and 3 are perspective views of a preferred positive plate wrapper configuration in different stages of assembly.
Figure 3:
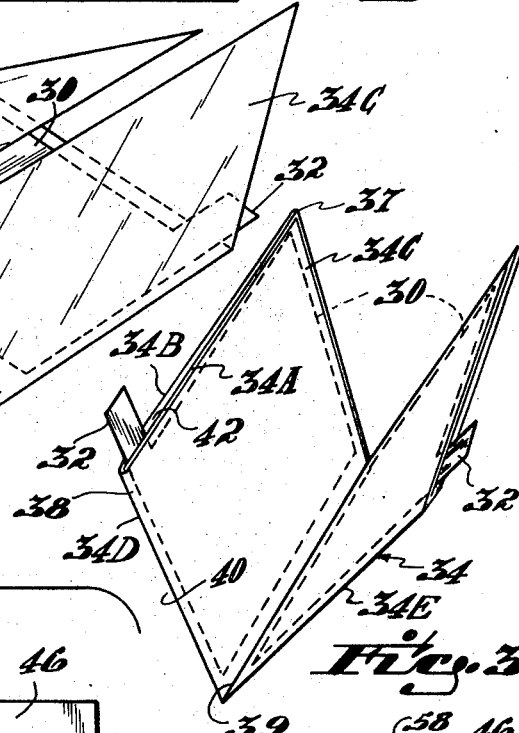
Figure 4:
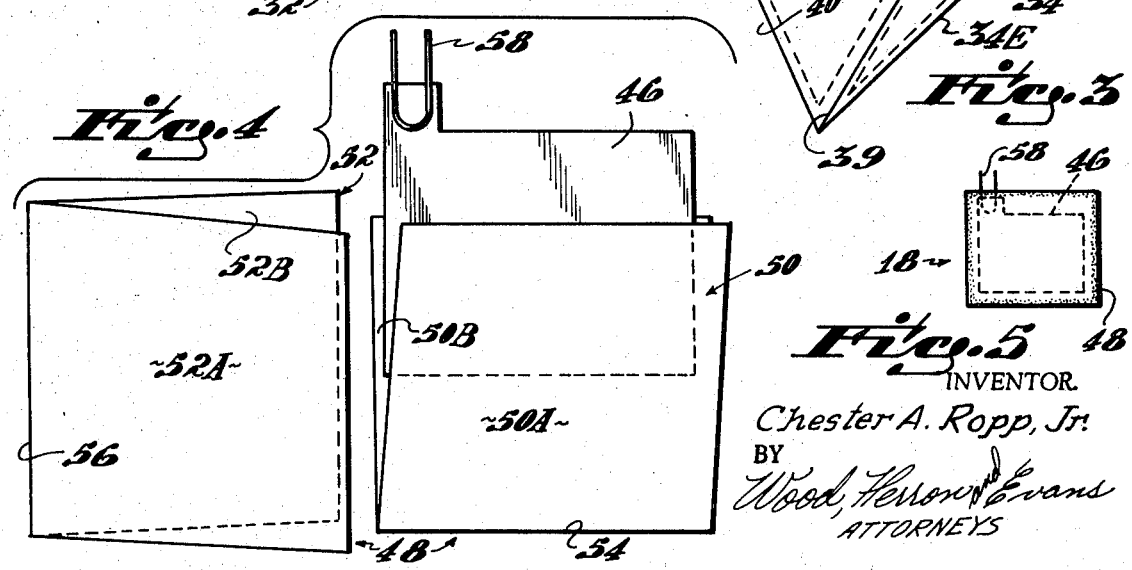
FIG. 4 is a perspective view, partially exploded, showing a preferred negative plate wrapper configuration employing the critical mole weight polyvinyl alcohol wrapper material of this invention.

The positive electrode of plate assembly 16 includes a positive plate or electrode 30 and a positive plate wrapper 34. The positive plate assemblies 16 are preferably fabricated in pairs as shown in FIGS. 2 and 3. The positive plate wrapper 34 is provided having three contiguous sections 34A, 34B and 34C approximately equal in area and having a width slightly larger than the width of the positive plate 30 and a length slightly longer than twice the length of the plate 30. The wrapper 34 is folded along lines 37 and 38 separating sections 34A and 34B and sections 34B and 34C respectively. With the wrapper 34 so folded, the sections 34A and 34C are folded back on the central section 34B in overlapping relationship to form a substantially elongated flat tubular envelope structure. The wrapper 34 with the sections 34A and 34C in overlapping relationship is then folded along a median line 39 (FIG. 3) effectively dividing the elongated tubular envelope into two upstanding wrapper sections 34D and 34E which enclose volumes effectively sealed from each other by the fold along median line 39. The wrapper sections 34D and 34E have their vertical side edges 40 closed and their horizontal top edges 42 open.

The material and thickness of the wrapper 34 must be such as to make the wrapper permeable to the hydroxyl ion when the sections 34D and 34E are immersed in an electrolytic solution of potassium hydroxide in order to enable the battery to sustain ionic conduction which is necessary to the electro-chemical battery charging and discharging operation. Additionally, the materials from which the wrapper 34 are constructed must be in soluble in caustic electrolytes. A suitable wrapper 34 has been found to be regenerated cellulose permeable films marketed by the E. I. du Pont de Nemours Company under the tradmark "Cellophane 134 PUDO" and/or "Cellophane 193 PUDO," and having a thickness of .0015 inch. Other suitable positive plate wrapper materials are "Cellophane 600" and "Cellophane 300" also marketed by E. I. du Pont de Nemours Company, non-woven matted cotton fiber, woven nylon, and irradiated polyethylene film.

The positive plate 30 is a conventional nickelic oxide plate. Nickelic oxide plates 30 may be fabricated by covering a grid formed of nickel screen, mesh or expanded sheet having a size approximating the size of the electrode with commercially available battery grade carbonyl nickel powder. The nickel powder, which is available from sources such as International Nickel Company, is applied to one side of the grid to a thickness of approximately .085 centimeter. The powder-covered grid is then placed in a conventional electrically fired hydrogen reducing oven for approximately five minutes at a temperature of approximately 800° F. and 1,000° F. which is effective to sinter the nickel powder converting the layer of nickel powder deposited on the grid into a spongy layer approximately 80%–90% porous.

The sintered nickelic oxide plate is removed from the oven and impregnated with molten nickel nitrate which becomes the active plate material. The impregnation is effected by placing the sintered plaque in a vacuum chamber to remove entrapped air from the pores of the sintered nickelic oxide and thereafter while the plaque is still in the vacuum chamber immersing the sintered nickelic oxide plaque in molten nickel nitrate at a temperature of approximately 150° F. Following the impregnation step, the impregnated plaque is placed in a bath of potassium hydroxide having a specific gravity of approximately 1.30 and contained in a nickel vessel. A reducing current is then applied by connecting a source of direct current between the nickel vessel and the immersed plaque, the positive and negative terminals of the direct current source being connected to the nickel container and the immersed plaque, respectively. The reducing current effectively converts the nickel nitrate which is impregnated in the pores of the sintered carbonyl nickel powder to nickelic oxide. The impregnating and reducing current steps may be repeated until a layer of nickelic oxide of the desired surface density is produced. In a preferred form of this invention the impregnating and reducing current steps are repeated until the density of the nickelic oxide is approximately 1.52 grams per cubic centimeter. The nickel electrode 30 when subjected to the foregoing processing steps is in an uncharged or unformed condition.

The positive electrode 30 also includes a conducting tab 32 to facilitate connection of the electrode to the positive terminal 20. The conducting tab 32 preferably is in the form of a piece of nickel sheet material which is welded to a corner of the nickel grid prior to fabrication of the electrode.

The negative electrode assembly 18 includes a negative electrode 46 and a negative plate wrapper 48. The wrapper 48 includes an inner section 50 and an outer section 52. The inner section 50 preferably is fabricated of non-woven nylon film having a thickness of approximately .013 centimeter. One such film is marketed by The Pellon Corporation under the trademark "Pellon 2506K." The inner wrapper portion 50 is formed of two one-half sections 50A and 50B divided by a fold along a median line 54 and each having an area slightly larger than the area of the plate 46. The inner wrapper sections 50 may be fabricated of any material which is capable of absorbing the caustic solution used as the electrolyte and necessarily, if used, must be permeable to the hydroxyl ion of the caustic electrolyte. Use of the inner wrapper 50, while it enhances the electro-chemical action of the cell, may be omitted if desired.

The outer electrode wrapper 52 includes substantially identical sections 52A and 52B folded along a median line 56, each having an area slightly larger than the area of the negative plate 46. The material from which the outer wrapper 52 is fabricated is critical and must be fabricated of polyvinyl alcohol film having a mole weight in the approximate range of 120,000–170,000. It has been discovered that the above-described polyvinyl alcohol film is the only wrapper material suitable for the negative electrode of the battery disclosed herein which prevents premature short-circuiting of the positive and negative plates 30 and 46 and enables the battery cells to be extensively recycled. In fact, it has been found that by using the foregoing polyvinyl alcohol film for the electrode wrapper 52 the nickel-zinc battery disclosed herein can be recycled as many as 100 times without failure, failure being defined as a drop in output voltage to 1.0 volt during a 125 minute discharge cycle. This recycling capability provided by the critical mole weight polyvinyl alcohol negative plate electrode wrapper of this invention is in contrast to recycling capabilities characterizing other wrappers which, in similar batteries, permit significantly less recycling. For example, nickel-zinc batteries having their negative zinc electrodes wrapped in polyvinyl alcohol films with mole weights of 40,000–100,000, 170,000–250,000, and greater than 250,000 recycled three, nine and twenty-seven times, respectively, before failure.

Suitable polyvinyl alcohol films having mole weights of 120,000–170,000 for wrapper 52 are commercially available from Reynolds Metal Company under the trademark "Reynolon PVA 4/6," and from Baldwin-Montrose Chemical Company, Inc. under the trademark "Mono-Sol 1–000."

The critical mole weight polyvinyl alcohol wrapper 52 for the negative zinc electrode preferably has a thickness of approximately .002 inch. Greater thicknesses can be used with a corresponding increase in internal battery resistance. Lesser thicknesses can be used with a corresponding decrease in mechanical strength and, hence, in resistance to puncture by dendritic growths which eventually are produced at the zinc plate 46.

The critical mole weight polyvinyl alcohol film wrapper 52 preferably is fully-hydrolyzed, that is, hydrolyzed to the extent of 98–100 mole percent hydrolyzation. Polyvinyl alcohol films of lesser mole percentage hydrolyzation may be used with a corresponding loss of film chemical stability when immersed in the electrolyte, and hence a corresponding loss in the ability of the wrapper 52 to withstand deterioration with time.

The zinc plate 46 may be fabricated by covering a silver grid of the approximate size of the plate desired with a paste formed of commercially pure zinc oxide and carboxy methyl cellulose binder. Commercially pure zinc oxide typically has a purity of approximately 98% and is free of lead. The silver grid with the zinc oxide paste is placed in an oven and dried for three hours at 125° F.

Figure 5:
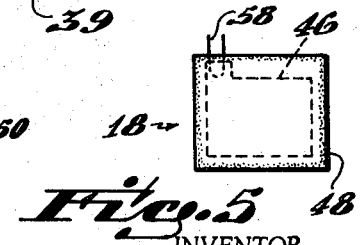
FIG. 5 is an elevational view of the assembled and edge-sealed negative plate wrapper.

As shown in FIG. 5, the inner wrapper 50, if used, and the outer wrapper 52 preferably are heat sealed along their unfolded edges to totally enclose the negative electrode 46. Such heat sealing can be accomplished in any conventional manner, for example, by moistening the edges to be joined with water and applying to the moistened edge a hot iron at a temperature of 125° F. to 250° F. for a period of time sufficient to fuse the edges of the respective wrappers.

The electrolyte preferably is an aqueous solution of potassium hydroxide having a potassium hydroxide content ranging from 25% to 45% by weight. Preferably the concentration of potassium hydroxide is 31%, providing a specific gravity of approximately 1.30. With the preferred potassium hydroxide concentration, the battery can be used in environments where the ambient temperature is as low as −40° F. without becoming inoperative by reason of the electrolyte freezing.

In operation, the positive and negative plate assemblies 16 and 18 are positioned in the cell casing 12 in face-to-face interleaved fashion as depicted in FIG. 1. The tabs 32 of the positive plate 30 are each connected to the lower portion 20A of the positive terminal 20 and conducting wires 58 of the negative plate 46 are connected to the lower portion 22A of the negative terminal 22. The cover 14 is then positioned to seal the cell casing 12 and permanently adhered thereto using a suitable adhesive compatible with the cell cover and casing material. The electrolyte is then added to the cell 10 through the opening and the opening thereafter closed by a suitable plug means (not shown).

Assuming the positive and negative plates 30 and 46 are in the uncharged state when inserted into the cell casing 12, the cell is charged by driving electric current through the cell in a direction opposite to that which current flows during battery discharge. Specifically, the cell is charged by connecting the positive and negative terminals of a direct current source to the negative and positive terminals 22 and 20 of the battery, respectively. With such a charging current flowing through the cell, the nickelous hydroxide constituting the anode of the cell is oxidized by chemically combining with hydroxyl ions to yield nickelic hydroxide. The oxidation of the nickelous hydroxide is effective to release electrons which flow from the anode or positive plate through the external circuit including the source of direct current to the cathode or negative plate. At the cathode or negative plate, the zinc hydroxide is reduced yielding elemental zinc and hydroxyl ions. The hydroxyl ions enter the electrolytic solution to replenish the hydroxyl ions utilized in the oxidation of the nickelous hydroxide at the anode. The chemical equation governing the electro-chemical action at the positive electrode 30, which constitutes the anode, is as follows:

$$Ni(OH)_2 + OH^- \rightarrow Ni(OH)_3 + electron$$

The chemical equation governing the electro-chemical action at the negative electrode 46, which constitutes the cathode, is as follows:

$$Zn(OH)_2 + 2\ electrons \rightarrow Zn + 2(OH^-)$$

Discharge of the cell is effected by electrically connecting the positive and negative terminals 20 and 22 through a suitable electrical load (not shown). Discharge of the battery is accomplished by oxidation of the elemental zinc at the negative plate 46 which constitutes the anode and reduction of the nickelic hydroxide at the positive plate 30 which constitutes the cathode. The elemental zinc is oxidized by chemically combining with the hydroxyl ion, yielding zinc hydroxide plus electrons. The nickelic hydroxide is reduced by the acquisition of electrons flowing from the negative plate 46 through the load yielding nickelous hydroxide plus hydroxyl ions, the hydroxyl ions entering the electrolytic solution to replenish the supply of hydroxyl ions which combine with the elemental zinc at the negative plate 46 to form zinc hydroxide. The equation governing the electro-chemical action at the zinc plate 46 which constitutes the anode is as follows:

$$Zn + 2(OH^-) \rightarrow Zn(OH)_2 + 2\ electrons$$

The equation which governs the electro-chemical action at the positive plate or cathode 30 is as follows:

$$Ni(OH)_3 + electron \rightarrow Ni(OH)_2 + OH^{-1}$$

During the discharging of the cell, zincate ions $$(K_2ZnO_2)^{+2}$$

are being produced at the zinc plate 46 by the reaction of potassium hydroxide and zinc hydroxide. The production of the zincate ions at the negative plate 46 is believed governed by the following equations:

$$2KOH + Zn(OH)_2 \rightarrow K_2ZnO_2 + 2H_2O$$

and $$K_2ZnO_2 + 2H_2O \rightarrow (K_2ZnO_2)^{+2} + 2(OH^-)$$

The zincate ion does not permeate the polyvinyl alcohol negative plate electrode wrapper 52 and consequently when the battery is recharged, no plating of the zincate ion on the wrappers of either of the positive or negative plates occurs. With the plating of the zincate ion on the wrappers of the electrode prevented, dendrites do not form and short-circuit adjacent positive and negative plates. Additionally, since the zincate ion is contained within the negative plate electrode wrapper 52, the zincate ion is not absorbed by the positive plate to produce a deleterious condition known as zinc poisoning which materially reduces the number of cycles to which the cells can be subjected without failing. It is significant and a critical feature of the invention that only negative plate electrode wrappers fabricated of polyvinyl alcohol film having a mole weight in the approximate range of 120,000–170,000 are capable of containing the zincate ion to the region around the negative plate, thereby preventing undesirable dendritic growth which leads to short-circuiting and zinc poisoning, while still permitting hydroxyl ions to pass from the region surrounding the negative plate to the electrolytic solution thereby sustaining the ionic current necessary to the electro-chemical action of the battery cell.

Having described the invention what is claimed is:

1. A secondary alkaline battery comprising:
    a caustic electrolyte;
    a positive electrode including nickel immersed in said electrolyte;
    a negative electrode including zinc immersed in said electrolyte; and
    a polyvinyl alcohol sheet having a mole weight in the approximate range of 120,000–170,000 disposed intermediate said electrodes.

2. The battery of claim 1 wherein said polyvinyl alcohol sheet substantially envelops said negative zinc electrode.

3. The battery of claim 2 wherein said polyvinyl alcohol sheet is rectangular and folded along a median line to form two parallel sections slightly larger than said electrode and between which said electrode is sandwiched.

4. The battery of claim 3 wherein the corresponding unfolded edges of each parallel section are heat sealed to each other encapsulating substantially the entire negative zinc electrode.

5. The battery of claim 1 wherein said polyvinyl alcohol is substantially fully hydrolyzed.

References Cited

UNITED STATES PATENTS

| | | | |
|---|---|---|---|
| 2,624,768 | 1/1953 | Toulmin, Jr. | 136—146 |
| 2,635,127 | 4/1953 | Yardney et al. | 136—6 |
| 2,866,841 | 12/1958 | Zahn | 136—147 |
| 2,956,100 | 10/1960 | Mendelsohn et al. | 136—146 |
| 3,045,058 | 7/1962 | Martinak | 136—146 |
| 3,069,486 | 12/1962 | Solomon et al. | 136—30 |
| 3,216,859 | 11/1965 | Duncan | 136—6 |
| 3,226,260 | 12/1965 | Drengler | 136—30 |
| 3,350,239 | 10/1967 | Stanimirovitch | 136—176 |
| 3,351,495 | 11/1967 | Larsen et al. | 136—146 |
| 3,438,808 | 4/1969 | Hawkins et al. | 260—91.3X |

ALLEN B. CURTIS, Primary Examiner

A. SKAPARS, Assistant Examiner

U.S. Cl. X.R.

136—28, 30, 146